United States Patent [19]

Paul, Jr. et al.

[11] 4,168,760
[45] Sep. 25, 1979

[54] WIRE-GUIDANCE APPARATUS

[75] Inventors: Ralph E. Paul, Jr., McDonough; Leigh E. Sherman, Binghamton, both of N.Y.

[73] Assignee: The Raymond Corporation, Greene, N.Y.

[21] Appl. No.: 894,747

[22] Filed: Apr. 10, 1978

[51] Int. Cl.² .................. B60K 27/00; B62D 3/00
[52] U.S. Cl. .................................. 180/168; 104/88; 246/182 AA; 318/587
[58] Field of Search .................. 180/98; 318/587; 104/88; 246/63 A, 167 R, 182 BH, 182 AA

[56] References Cited

U.S. PATENT DOCUMENTS

| | | | |
|---|---|---|---|
| 3,038,970 | 6/1962 | Pazuka | 180/98 |
| 3,495,677 | 2/1970 | Wilson | 180/98 |
| 3,736,420 | 5/1973 | Elder et al. | 246/182 AA |
| 3,768,586 | 10/1973 | Thompson et al. | 180/98 |

*Primary Examiner*—David M. Mitchell
*Attorney, Agent, or Firm*—Richard G. Stephens

[57] ABSTRACT

Routing decisions for vehicles following current-carrying guidewires and carrying destination addresses are made at intersections of a guidewire system without the need for storing large amounts of data at the intersections by making inequality and equality comparisons of destination addresses with one or a few numbers stored at each intersection and basing routing on the results of one or a combination of two such comparisons.

18 Claims, 8 Drawing Figures

|   |              | $A_1$ | $A_2$ |
|---|--------------|-------|-------|
| 1 | $= A_1 + < A_2$ |       |       |
| 2 | $= A_1 + = A_2$ |       |       |
| 3 | $= A_1 + > A_2$ |       |       |
| 4 | $< A_1 + < A_2$ |       |       |
| 5 | $< A_1 + = A_2$ |       |       |
| 6 | $< A_1 + > A_2$ |       |       |
| 7 | $> A_1 + < A_2$ |       |       |
| 8 | $> A_1 + = A_2$ |       |       |
| 9 | $> A_1 + > A_2$ |       |       |

FIG. 4a

WIRE-GUIDANCE APPARATUS

This invention relates to method and apparatus for automatically routing vehicles to desired destinations, and more particularly, to method and apparatus for routing wire-guided vehicles in warehouses, factories and the like. It is highly desirable in most applications using wire-guided vehicles that one or more vehicles be capable of being routed automatically to any one of numerous possible destinations. To avoid a need to manually route or re-position such vehicles, the wire-guidance paths normally form closed loops. To provide the flexibility in routing needed in many warehouses, a wire guidance "floor layout" usually includes a substantial number of interconnected loops, providing a number of intersections where a given vehicle must be made to follow one or the other of two possible paths. Numerous differences in size, numbers and arrangements of aisles, loading docks, storage spaces and work locations exist between different warehouses and factories, and wide variety exists between the number of different vehicle trips which are needed or desired to accommodate operation. Due to the wide variety between installations and the complexity of desired operations, automatic routing often presents a formidable control problem. If a system has say ten locations to and from which vehicles are to be dispatched, and if one desires that a vehicle be capable of being sent from any such location to any of the remaining nine, a total of 90 different trips must be controlled. If one desires in addition that some or all of the trips proceed along the shortest possible path, immense added complexity may be added to the problem. In the past the control problem principally has been attacked with the brute force approach of providing elaborate, complex and expensive equipment. Some prior art systems have accomplished automatic routing through use of a central computer which keeps track of the location of each vehicle and determines the routing of each vehicle as it arrives at an intersection. Use of a computer adds expense and complexity to such a system, and one object of the present invention is to provide an automatic routing system for wire-guided vehicles which does not require use of a central computer.

It previously has been proposed that a controller be provided at each intersection, with numerous destination addresses stored in the controller in two groups. As a vehicle carrying a given destination code arrives at the intersection, its destination code can be compared with numerous destination addresses stored in the controller, and the vehicle then caused to turn or not turn depending upon whether its destination code matches a destination address stored in the first group or instead the second group. The use of a read-only-memory (ROM) would readily allow a large number of destination addresses to be stored quite economically in such an intersection controller. Each intersection controller ordinarily would be required to have different sets of destination addresses stored in it, so that overall system routing would depend upon a large amount of stored data. While such an arrangement may function perfectly adequately under ideal conditions, it tends to cause substantial maintenance problems. If a ROM in such a floor controller fails, system operation is interfered with until a properly coded substitute ROM can be obtained and installed, and provision of a substitute ROM requires knowledge of all of the addresses which must be stored in it. If a guided-vehicle manufacturer were responsible for maintenance of such a system, he would have to keep accurate and up-to-date records of all of the destination addresses at all of the guidance intersections of his customers, which tends to pose a formidable record-keeping problem. One object of the present invention is to provide a wire-guided traffic routing system wherein large masses of data need not be stored in or for intersection controllers. If numerous addresses are stored at each intersection, numerous comparisons with a vehicle destination code tend to be required before a routing decision is made, increasing the chance that an error may occur, due to noise, for example, and requiring substantially more complexity in each intersection controller. Another object of the invention is to provide a wire-guided traffic routing system wherein very few data comparisons need be made prior to a routing decision and wherein each intersection controller may be simple.

As alternatives to storing a large amount of routing data at each intersection, it is possible to store routing data for every desired vehicle trip aboard each vehicle, or to provide on-board equipment for decoding intersection addresses, but such strategms tend to be quite expensive and complex, since it is usually desired that many vehicles be used on a given floor layout, so that added equipment costs would be multiplied by the number of vehicles to be used. Thus another object of the invention is to provide an improved wire guidance system wherein vehicles need carry only data respecting their desired destinations.

A mass-storage device such as a ROM also tends to have a higher failure rate than devices capable of storing only a few numbers, and another general object of the invention is to provide an improved wire-guidance system having high reliability.

For sake of economy it is important that an intersection controller have general utility in the sense of being usable in a wide variety of applications rather than being tailor-made for and useful only in one or a few types of intersections. A further important object of the invention is to provide a form of intersection controller which is simple, inexpensive and reliable and yet capable of effective use at any one of numerous different intersections in a complex traffic system even though the given destination addresses must be treated widely differently at different intersections.

It is desirable that a guidewire routing system have provisions for routing empty vehicles to certain destinations and provisions for preventing too many vehicles from accumulating at various destinations, and an improved wire guidance system which can also readily accommodate such further provisions is another object of the invention.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which.

Figure 1:
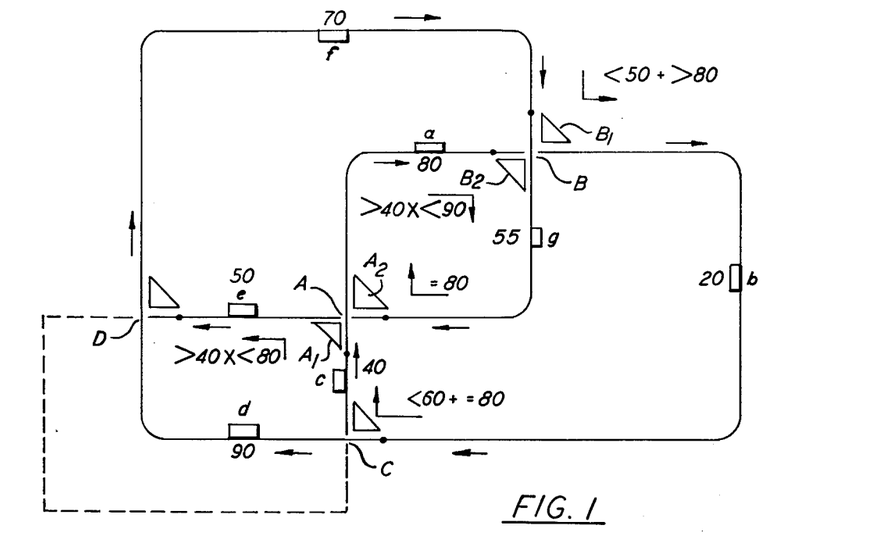
FIGS. 1 and 1a are guidewire traffic pattern diagrams useful in understanding the operations of the invention.

The nature of the problems involved in routing vehicles which carry only a destination address may be better understood by reference to FIG. 1, wherein a main guidewire indicated by a heavy line extends around a floor of a warehouse or factory. The system of FIG. 1 contemplates that vehicles travel in only one direction along any given section of the guidewire, and arrows adjacent various sections of the wire indicate assumed directions in FIG. 1. Guidewire sections will be seen to cross at two "four-way" intersections labelled A and B. Guidewire sections also cross at intersections C and D, but these will be termed "three-way" intersections because vehicle travel does not occur along the portion of the main guidewire shown in dashed lines.

A plurality of small rectangles situated along various sections of the main guidewire and labelled a to g represent desired destination, which will be termed spurs. In a typical application one or more workers will be stationed adjacent each spur or will periodically visit each spur to load or unload vehicles which have arrived at the spur, and then dispatch vehicles to exit from the spur onto the main guidewire headed toward a new destination spur. Each section of the main guidewire which extends between a pair of intersections will be termed a branch. In FIG. 1 only one spur is shown located along each branch for simplicity of explanation, but in practice numerous spurs may be located in succession along a given branch.

Assume that it is required that one be able to send a vehicle from any spur in FIG. 1 to any one of the remaining spurs. That requirement manifestly requires that decisions be made respecting whether or not a vehicle is caused to turn when it arrives at any of the intersections. In FIG. 1 turning loop means for controlling whether or not a vehicle turns at the various intersections are diagrammatically shown as small triangles. As a vehicle approaching an intersection such as A, B, or C reaches a point on the main guidewire indicated by a small circle, a decision must be made respecting whether the vehicle will be turned or instead allowed to continue straight forward. At a "three-way" intersection such as that shown at D, when vehicles traveling from spur e reach the decision point, no routing decision need be made, since all vehicles must turn when they approach intersection D from that direction irrespective of their final destination.

As a vehicle which has passed spur f aooroaches imtersection B, turning loop $B_1$ must be energized to turn the vehicle if its required destination is spur b, but loop $B_1$ must be de-energized (and turning loop $B_2$ also de-energized) so that the vehicle can continue past the intersection without turning if its required destination is instead spur g. As a given vehicle approaches intersection B, it can transmit the destination code which it carries to controller apparatus at that intersection which controls whether or not turning loops $B_1$ and $B_2$ will be energized. If the vehicle is to carry only a destination code, whether or not turning occurs under such circumstances manifestly must be based on some interpretation of that code. As previously mentioned, it is an important object of the invention to avoid the need for storing all or a large number of destination codes at an intersection in two groups and determining in which of the two groups a given code is contained every time a vehicle approaches an intersection. In accordance with a central concept of the present invention, routing of a vehicle at a decision point is determined on the basis of either whether its destination code is equal to, or less than, or greater than a first number stored at an intersection, or in some cases, based on a combination of such comparisons with two numbers stored at an intersection.

Comparison of two numbers to provie a binary logic signal having one value or another dependent upon whether the two numbers are equal or not equal is termed an equality comparison. Comparison of first and second numbers to determine whether the first is greater than the second or not greater than the second is a "greater than" inequality comparison, and comparison of first and second numbers to determine whether the first is less than the second is a "less than" inequality comparison. As will be seen below, the invention contemplates that various controllers at decision points in a system using the invention will use one or more of the three mentioned types of comparison to provide a routing decision.

Figure 1A:
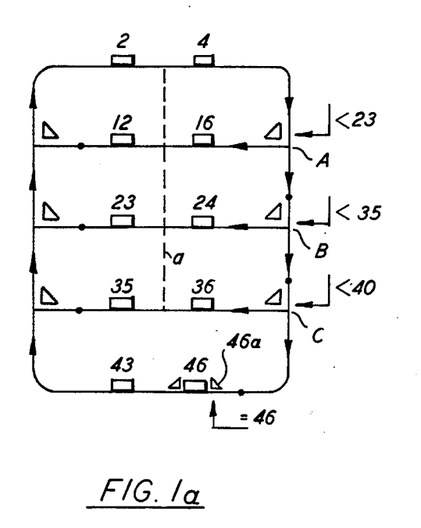

In certain very simple traffic patterns, and in isolated portions of some very complex traffic patterns, the use of a selected one of the three mentioned types of comparison is adequate and allows one to readily assign addresses. For example, in the simple system shown in FIG. 1a, with destination address specified as shown for the various spurs, a vehicle can be routed from any spur to any other spur if the controllers indicated by three triangles on the right side merely make the three respective "less than" inequality comparisons indicated by their associated turn arrow legends. The dashed lines in FIG. 1a are to be ignored for the moment. Thus vehicles coming down the right side turn at intersection A if they have a destination code less than 23 (and otherwise continue downwardly), turn at intersection B if they have a destination code less than 35 and otherwise continue downwardly, etc., always turning if they come to one of the rounded corners shown. Further decisions can be made as vehicles approach given spurs. For example, a turning controller indicated by small triangle 46a adjacent spur 46 can turn a vehicle onto spur 46 if the vehicle address equals 46. Similar provisions can be made for each other spur.

While a simple traffic pattern like that of FIG. 1a may find use in some applications, its simplicity greatly decreases its utility for many applications. For example, a trip from say spur 36 to spur 23 requires a long path of travel past spurs 35, 2, 4, intersection A, in turn at intersection B and travel past spur 24 to spur 23. Substantial savings in time, energy and vehicle wear could be effected if such a trip could be made along the dashed line a in FIG. 1a, and similar savings could be made for numerous other trips from spur to spur in FIG. 1a if trips could be made along other dashed line paths shown. However, the addition of added paths such as those indicated by dashed lines requires that decisions to turn or not to turn be made at further intersections, two of which now must be "four-way" intersections. Innumerable different traffic patterns may be deemed desirable in different material transporting applications, giving rise to great complexity.

Where a traffic pattern incorporates such complexity, a serious problem arises in attempting to device workable destination codes for the spurs, because trips to a given destination can originate from many different spurs and proceed along many different paths. If a controller at an intersection is arranged to take a specific action, such as energizing a given turning loop upon receipt of a given destination code number, one finds that such an arrangement may work properly for trips from some spurs to the spur represented by the number, but be improper for trips from other spurs to the same destination spur, defeating the assumed requirement that a vehicle be routable from any spur to any other spur. For example, referring back to FIG. 1, if a vehicle is to proceed from spur c to spur a, it must pass through intersection A without turning, and hence the spur a destination address must be a number or code with causes turning loops $A_1$ and $A_2$ to be de-energized as the vehicle passes through intersection A. Conversely, if the vehicle is to proceed from spur g to spur a, turning loop $A_2$ must be energized so that the vehicle will turn toward spur a as it reaches intersection A. The difficulty of picking a single destination code for spur a which would cause the two opposite types of action becomes apparent. In accordance with a further important concept of the invention, two numbers may be stored to make a decision at an intersection, and turning or not turning then may be based upon a logical combination of inequality and/or equality comparisons made with those two numbers. For example, in FIG. 1, the turning arrow legend adjacent loop $B_1$ indicates that loop $B_1$ will be energized to turn a vehicle approaching that loop from spur f toward spur b if the destination address carried by the vehicle is either less than 50 or greater than 80, to legend implying that such turning will not occur if neither of those conditions is met. While loop $B_1$ is controlled by inclusive oring of two inequality comparisons, loops $B_2$ and $A_1$ controlled by anding two inequality comparisons, loop $A_2$ by a single equality comparison, and loop C by an oring of the results of an equality and an inequality comparison. With the combined logic functions shown in FIG. 1a, addresses are easily assigned to the various spurs so that travel can occur from any spur to any other spur, and so that shortest possible travel paths are used, given the assumed one-way travel along the guidewire sections.

Figure 2:
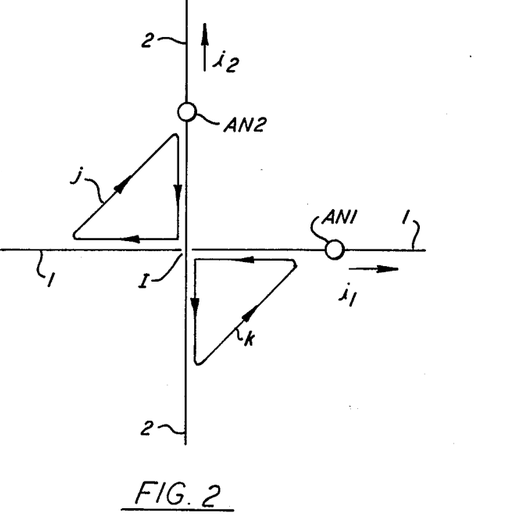
FIG. 2 is a diagram of a portion of a traffic pattern useful in illustrating the characteristics of a flux-cancellation loop turning means preferred for use with the invention, and FIG. 2a diagrammatically illustrates use of the invention with a different form of turning means.

The intersection routing control system depicted schematically in FIG. 1 may be better understood by reference to FIG. 2. Guidewires 1 and 2 shown crossing at point I carry alternating currents $i_1$ and $i_2$, respectively, with an instantaneous direction for each of these currents indicated by an arrow. Wires 1 and 2 are electrically separate from each other at point I, though they both may be in series with other guidewire sections not shown in FIG. 2. The guidance sensor of each vehicle (not shown) causes each vehicle to follow the inductive field which surrounds each length of energized guidewire. A pair of field cancellation loops j, k are shown, each having a pair of leg portions situated closely adjacent portions of wires 1, 2 and a hypotenuse portion. Each of loops j and k is connected to switching equipment in a manner to be shown, so that when it is energized the current in its two leg portions is opposite in sense or antiphase to those in the closely adjacent sections of wires 1 and 2, hence cancelling the inductive fields surrounding those sections, arrows on loops j and k in FIG. 2 indicating directions opposite to those of $i_1$ and $i_2$.

The use of two cancellation loops are provided as in FIG. 2; providing two approach paths toward the intersection and two exit paths away from the intersection. With the loops situated as in FIG. 2, one may have vehicles approach the intersection from the left and from below the intersection and exit to the right and upwardly from the intersection, or one can instead approach downwardly or from the right and exit leftwardly and downwardly in FIG. 2, but the choice of one arrangement in any given system precludes use of the other. The second mentioned arrangement will be assumed. If a vehicle approaches traveling downwardly along wire 2, if neither loop j nor loop k are energized the vehicle will continue straight downwardly through the intersection, exiting on wire 2, and similarly, if neither loop j nor k is energized and a vehicle approaches from the right, it will continue straight along wire 1. If loop j is energized, a vehicle approaching downwardly on wire 2 will follow the hypotenuse of loop j onto wire 1 and exit leftwardly. If loop k is energized, a vehicle approaching from the right along a wire 1 will follow the hypotenuse of loop k and exit downwardly on wire 2. It will be noted that when a given turning loop is energized to turn an approaching vehicle, whether the other loop is then energized or not energized is irrelevant, but if a vehicle is to proceed through the intersection, both loops must be de-energized. Small circles at AN1 and AN2 represent antenna loops placed adjacent wires 1 and 2 along their approach portions. As a vehicle approaches the intersection, its repeatedly transmitted destination code is picked up by one or the other of the antenna loops and processed by the floor controller to cause selective energization or de-energization of one of the cancellation loops, and if it is de-energization, then also de-energization of the other cancellation loop. Sometimes a single loop is used at a "T" or 3-way intersection having only one approach path, as would be the case if loop j were removed in FIG. 2 and the portion of wire 2 above the intersection were not used to guide vehicles. If a single approach path is used at an intersection, only one atenna is required, of course. The broad idea of determining vehicle routing by selective energization of a flux-cancelling loop is not itself new, such a system being shown, for example, in U.S. Pat. No. 3,038,970. Furthermore, intersection controllers constructed in accordance with the invention can be arranged to control vehicle turning by means other than flux cancellation, as will be explained below.

Figures 3, 3A:
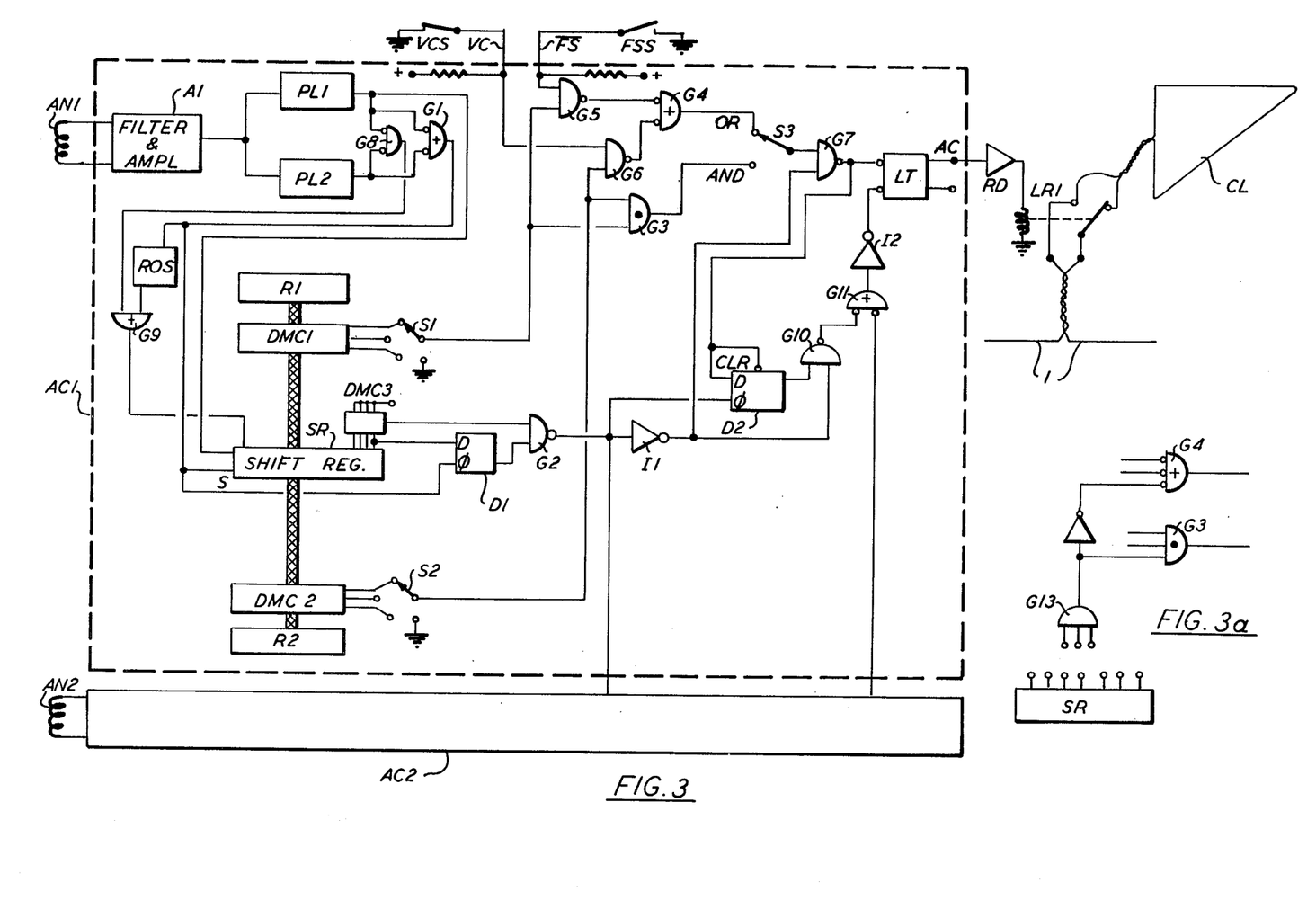
FIG. 3 is an electrical schematic, partially in block form, illustrating a preferred form of intersection controller in accordance with the invention.
FIG. 3a illustrates one possible modification of the device of FIG. 3.

In FIG. 3 a controller capable of controlling two cancellation loops is shown as comprising circuits AC1 and AC2 connected to respective ones of the antennas. Circuits AC1 and AC2 may be identical, so only circuit AC1 will be described in appreciable detail. It will be assumed that each vehicle repeatedly transmits a serial binary code, transmitting frequency $f_1$ to represent a binary 1 value and frequency $f_0$ to represent a binary 0 value. Signals from antenna AN1 are connected to a filtering and amplifying circuit A1 operative to amplify the two frequencies. The amplified signals are applied to each of a pair of pahse-locked loop circuits PL1 and PL2 each tuned to receive and lock on a respective one of the frequencies and to provide a low logic signal when locked on its respective frequency. The two logic signals are combined by OR gate G1 to provide shift pulses to shift register SR, and the output signals from PL1 are connected as data input signals to the shift register. To frame or synchronize the transmitted code trains and to insure response only to properly transmitted and received signal trains, the first four bits of each code are always transmitted as four logic 1s after a logic 0 has been transmitted, and address numbers are selected so that four logic 1s otherwise never appear in succession after a logic 0.

The PL1 and PL2 outputs are connected to and gate G8 which provides an output signal if both phase-locked loop outputs are logic zero at the same time, a condition which should not occur during reliable transmission and reception. A re-triggerable one-shot ROS remains set if shift pulses occur at a regular rate, but resets to provide a logic signal if a shift pulse is not received for a time period longer than the period of the one-shot. These two logic signals are applied via or gate G9 to clear the shift register to all zeros if either of the mentioned error conditions occurs. When a logic 0 is stored in flip-flop D1, conditionally enabling gate G2, if the first four bits then stored in the last four stages of the shift register are logic 1s, a four-bit digital comparator DMC3 then enables gate G2 to drive its output low, signifying that a destination code has been properly received and stored in the shift register. The particular system shown for receiving serial bits and storing them to provide a parallel multi-bit signal is not an essential feature of the invention and various equivalent systems are known.

The parallel multi-bit signal then stored in the shift register is shown applied simultaneously to first and second digital magnitude comparators DMC1 and DMC2, each of which is also connected to receive a respective number stored in a register R1 or R2. Each register preferably comprises a plurality of thumbwheel switches but could comprise one of various other types of digital registers. Any one of a variety of different codes could be used, such as natural binary, binary coded decimal, or even reflected binary if the comparators can use such a code. Binary coded decimal is preferred. Each digital magnitude comparator is capable of making both equality and inequality comparisons, and can comprise, for example, one or several cascaded commercially-available Texas Instruments Type SN 7485 digital magnitude comparators. Each magnitude comparator has three output lines, a different one of which provides a logic 1 signal depending upon whether the vehicle-transmitted destination code applied to the comparator from the shift register is greater than, equal to, or less than the stored number applied to the comparator from its associated register, R1 or R2. The trio of output lines from each comparator is shown applied to a respective selector switch S1 or S2. The pair of logic signals selected by the two selector switches are connected to an and gate G3, the output of which is connected to a terminal of selector switch S2 labelled "AND", and via gates G5 and G6 to or gate G4, the output of which is connected to another terminal of switch S3 labelled "OR". With the arrangement shown, it will be seen that positioning of selector switches S1, S2 and S3 allows one to supply to gate G7 any one of the six logic outputs provided by comparators DMC1 and DMC2, or an anded or ored combination of two logic outputs from the two comparators, or in essence selection of any one of 24 different logic signals. Whether the logic signal applied to gate G7 with a given destination code number in the shift register is logic 1 or logic 0 will depend, of course, upon how the numbers stored in registers R1 and R2 compare with the given number, and the positions selected for switches S1, S2 and S3.

The low signal occurring from gate G2 when an address has been received is inverted by inverter I1 and applied to gate G7. If the selected logic signal applied to gate G7 is then logic 1, G7 will be enabled, setting latch LT, providing logic 1 on line AC, and edge-triggered flip-flop D2 will be cleared. If the selected logic signal from switch S3 instead is then logic 0, gate G7 remains disabled and edge-triggered flip-flop D2 is set when the next clock pulse occurs, enabling nand gate G10 and applying a signal via gate G11 and inverter I2 to clear latch LT, lowering line AC and raising line $\overline{AC}$.

The output signal from gate G2 which goes low when an address has been received is shown extending to circuit AC2. The output line of the counterpart of gate G2 in circuit AC2 is connected to gate G11 of circuit AC1. Thus if an address is received in circuit AC2 from transmission picked up by antenna AN2, latch LT in circuit AC1 is automatically cleared, and if an address is received in circuit AC1 from antenna AN1 the counterpart of latch LT in circuit AC2 is cleared.

To increase the utility of the system, one may select a predetermined destination code number not used as the address of a spur, and use it as a "vehicle call" number, enter that number as a fictitious destination in vehicles which are empty (or full, or which have some other specified condition), and then allow those vehicles to travel along the main guidewire in search for the non-existent destination. If the vehicle call number is set into register R2 of the controller at an intersection, switch S2 positioned to the equality output of comparator DMC2, and switch VCS is opened to conditionally enable gate G6, when a vehicle carrying the call number arrives at the intersection, gate G6 will be enabled, setting latch LT via gates G4 and G7, and energizing a turn loop to route the vehicle onto a spur, for example. If switch FSS at an intersection leading to a spur is closed when the spur is full, i.e. occupied by a maximum desired number of vehicles, gate G5 will be disabled, and an approaching vehicle will not be turned onto the spur even if its destination address coincides with the number stored in register R1 of the intersection controller. The two oppositely-driven output lines of latch LT are made available so that a flux-cancellation loop can be controlled by either one, or so that two loops may be individually controlled in opposite fashion.

In FIG. 3 set output line of latch LT is shown connected via a relay driver amplifier RD to control a cancellation loop relay LR1. The terminals of a cancellation loop CL and connections to a short "break" in a main guidewire 1 are each shown connected via twisted pairs, so that in the position of relay LR1 shown the cancellation loop is connected in series with the main guidewire, while the opposite position of relay LR1 the relay contact shorts across the "break" in the main guidewire and loop CL is not energized. Circuit AC2 may control a cancellation loop (not shown) in generally similar fashion, although different numbers ordinarily will be stored in the two registers in circuit AC2 and the selector switches will be positioned differently in the two circuits, so that the loop controlled by circuit AC2 will be energized by a different set of destination addresses than loop CL. With an intersection of the type shown in FIG. 2, both cancellation loops are never energized at the same time. If a vehicle destination signal is picked up by antenna AN1 along one approach path at such an intersection, and if the signal causes latch L in circuit AC2 to be set and loop CL to be energized, circuit AC1 simultaneously clears the counterpart latch in circuit AC2, causing de-energization of the loop controlled by circuit AC2 if it is then energized. Once either latch is set or cleared it remains set or cleared even after the vehicle clears the intersection, until another vehicle approaches either antenna AN1 or antenna AN2. The circuits shown as AC1 and AC2 each may be located on a separate etched circuit card. At some intersections only one such card will be needed, and in such a case, if only card AC1 is used, the input to its gate G11 shown leading from circuit AC2 will be tied to a logic 1 potential and the connection from its gate G2 to circuit AC2 will not be made.

The concept of radio-frequency transmission of codes to a floor antenna as a serial code and storage of such a transmitted signal in a shift register is by no means new. Parallel transmission or combined serial-parallel transmission using multiple frequencies could be substituted without departing from the invention. Further, a destination code can be transmitted or applied to an intersection controller in various ways other than using RF transmission without departing from the invention. Magnets could be used aboard the vehicle to operate floor-embedded reed switches, and various mechanical and photosensor equivalents are known. It is possible and within the scope of the invention to make equality and inequality comparisons serially by bit as a vehicle-carried code is transmitted or otherwise applied to a controller, though the parallel comparison system shown is preferred, mainly because of its greater simplicity.

The function of the selector switches S1 to S3, or gate G4 and and gate G3 is to allow a controller to be readily adjusted so that turning will be caused by reception of a particular type of number set. For example, all numbers greater than the number stored in register R1 is one type of number set, and it can be selected by positioning switch S1 to select the "greater than" output of comparator DMC1, positioning switch S2 to ground, and positioning switch S3 to the OR terminal as shown. All numbers greater than the number stored in R1 and less than that stored in R2 is a different type of number set, and a variety of different types may be selected by various combinations of selector switch positions. It is not necessary to use selector switches per se, and will be evident that the selections could instead be made by other selective connection means, such as patchcords, for example.

Figure 4:
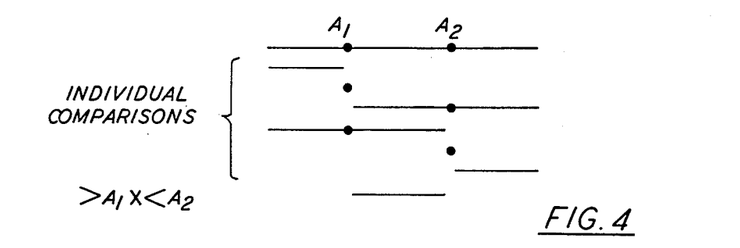
FIGS. 4 and 4a are graphs of number sets useful in understanding operation of the invention.

If the numbers stored in registers R1 and R2 of a given controller are designated $A_1$ and $A_2$, respectively, its comparators DMC1 and DMC2 provide six logic signal outputs: $>A_1$, $=A_1$, $<A_1$, $>A_2$, $=A_2$ and $<A_2$. In FIG. 4 an upper line represents an entire spectrum of numbers within which destination addresses may be specified, such as from zero to the largest number N which may be accommodated by the comparators, and two points $A_1$ and $A_2$ are shown arbitrarily located along the line. $A_2$ has been arbitrarily assumed to be larger than $A_1$, but it is by no means necessary that numbers stored in R2 be larger than those stored in R1. The next six lines graphically depict the six different sets of numbers, any one of which may be selected, and all of which sets differ from each other.

Figure 4A:
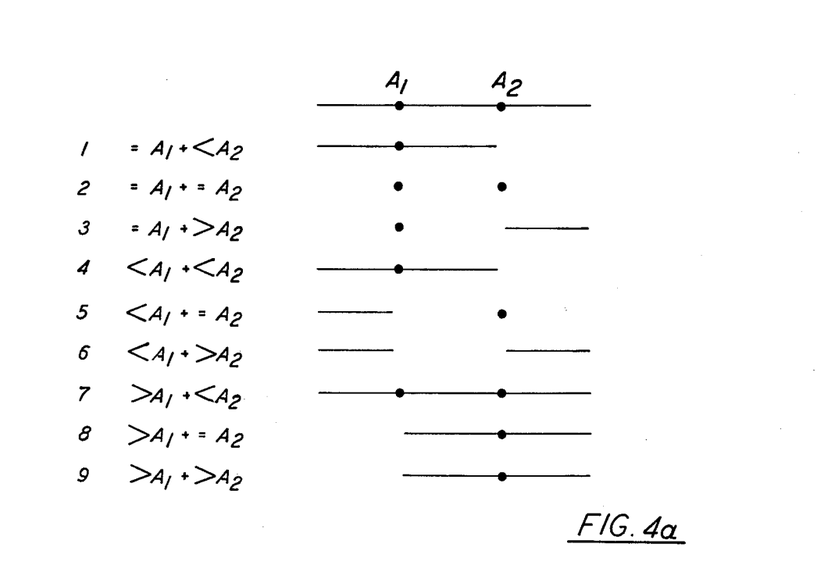

FIG. 4a graphically depicts in similar fashion the different types of number sets which may be selected using two stored numbers with switch S3 positioned to select the oring of the two comparisons selected by S1 and S2. It will be seen that some types of number sets may be selected in several different ways, that the 1st, 4th, 8th and 9th combinations do not differ from types of number sets obtainable with a single comparison, and that the 7th set includes all numbers, making no selection. However, the other four combinations define number sets differing from those available from a single comparison. If switch S3 selects the AND function a further type of number set shown at the bottom of FIG. 4 can be obtained. Various further types of number sets can be obtained using the AND function, but they do not differ from those shown in FIGS. 4 and 4a. The selection and logical combination of two comparisons will be seen to allow ready adjustment of a controller to provide turning upon receipt of a selected set of numbers, and the fact that controllers at different intersections can be made to respond to different types of number sets, as well as employing different numbers, is a feature which allows very complex traffic patterns to be automatically controlled. It is important to note that various changes can be made in the logic shown in FIG. 3 to select the same types of number sets, substituting different types of gates in accordance with standard practice. Furthermore, a third comparator and third register could be added to provide further logic signals to be combined with the six shown in FIG. 3, although it is believed that their added expense is unnecessary for most practical applications.

The logical combinations of plural comparisons tend to provide advantages over single comparisons only when they provide "gaps" between one number or string of numbers and a second number or string of numbers. In FIG. 3 two logic outputs from a given comparator are not shown logically combinable, though they could be easily made so, for the reason that they provide no distinctly different type of number set. For example, arranging a controller to respond to numbers less than $A_1$ and to $A_1$ itself is theoretically different from responding only to numbers less than $A_1$, but in practice the same result may be obtained by a single less than comparison using a number for $A_1$ which is larger by one.

The ease with which one can assign suitable addresses in a very complex traffic pattern tends to increase if one can select from numerous types of number sets having one or more gaps in their sequences. In FIG. 3a gates G4 and G3 are each shown provided with an added input line but otherwise assumed to be connected as shown in FIG. 3. The added input lines are driven by gate G13, which may comprise an OR gate or an AND gate having a plurality of input lines which may be connected by patchcords (not shown) to one or more of the bit stages of the shift register SR. The set of numbers for which the controller will cause a turn then may be arranged to include numerous gaps and to exclude various ranges of numbers. For example, if the least-significant bit stage of the shift register is connected to gate G13, a controller which otherwise would cause turning for all addresses less than $A_1$ can be arranged to instead cause turning only for all odd-number addresses less than $A_1$. For most applications the modification shown in FIG. 3a is unnecessary, and proper operation can be obtained by arranging spur addresses in one of several ascending orders or sequences.

Given a desired traffic pattern, one can list the turns which should be made for each desired trip. If one requires a trip from any spur to any other spur in FIG. 1, or a total of 30 different trips, and requires that each trip follow the shortest possible route given the constraint of one-way travel assumed, one can determine that the respective turning loops should or should not cause turns as per the following schedule.

| Loop | Turns for Trips to Spurs | No turns for Trips to Spurs |
|------|--------------------------|-----------------------------|
| $A_1$ | e f | a b c d |
| $A_2$ | a | b c d e f |
| $B_1$ | b c d | a e f |
| $B_2$ | e f | a b c d |
| C | a c e | b d f |

Using prior art techniques one could store three numbers at controllers for loops $B_1$ and C, two numbers in the controllers of loops $A_1$ and $B_2$, and a single number in the controller for loop $A_2$, and make only equality comparisons of vehicle destinations to provide vehicle routing. While such a system would be quite feasible with the very simple floor layout of FIG. 1, where only one spur is shown along a given branch, it will be seen that many more numbers would have to be stored as spurs are added. For example, if a spur were added along the branch carrying spur e, its address would have to be added to those stored in the three controllers for loops $A_1$, $B_2$ and C. Thus provision of plural spurs along various branches can markedly increase the required number storage in the intersection controllers if only equality comparison is used. With the system of the invention, any number of spurs may be added along most of the branches without requiring storage of any more numbers in most intersection controllers, although larger numbers may have to be stored in the intersection controllers, and a few controllers may require storage of an added number as will become clear below.

After determining the various groups of spurs or destination for which the various intersections should cause turns, one must select some order which arranges the spurs in an ascending (or descending) numerical sequence. Assume one chooses the sequence abcdef as an ascending sequence, such as:

| a | b | c | d | e | f |
|---|---|---|---|---|---|
| 10 | 20 | 30 | 40 | 50 | 60 |

One then can easily arrange the $A_1$ and $B_2$ controllers to cause turns for addresses greater than 40 and arrange the $A_2$ controller to cause turns for addresses less than 10. One can arrange the $B_1$ controller to cause turns for addresses greater than say 19 and less than say 45. Selecting the rule of operation for controller C becomes troublesome, however, with the sequence assumed, because two spurs b and d at which turns are not to be made lie at two places in the sequence in between those at which turns are to be made. However, by merely selecting a different sequence, the problem is easily overcome. FIG. 1 is shown using the sequence

| b | c | e | f | a | d |
|---|---|---|---|---|---|
| 20 | 40 | 50 | 70 | 80 | 90 | but it should be noted that numerous different sequences could instead be used. The addresses shown in FIG. 1 are arbitrarily shown as multiples of ten, providing large gaps between address numbers. It will be apparent that many other spurs could be provided along various branches in FIG. 1 using omitted numbers as their addresses.

Figure 2A:
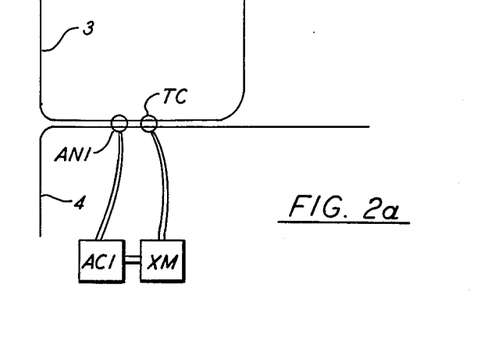

Though vehicle routing has been shown controlled by flux-cancellation loops, the invention is applicable as well to systems which cause turning by switching to different frequencies. In FIG. 2a guidewire 3 carries a current of frequency $f_A$ while guidewire 4 carries a current of different frequency $f_B$, and each vehicle follows the wire carrying whichever of those two frequencies its steering sensor is connected to receive. A transmit coil TC situated adjacent the guidewires can broadcast one or several control frequencies which cause the vehicles to select one or the other of the guidewire frequencies for steering control. Such systems are well known. It will be apparent that rather than selectively energizing a flux-cancellation loop, the output latch LT (FIG. 3) of circuit AC1 can be arranged to switch a transmitter XM to cause transmit coil TC located at the decision point to selectively transmit one or the other of two control frequencies to a vehicle at the decision point, to cause the vehicle to follow either guidewire 3 or guidewire 4.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a wire-guidance system having a current-carrying guidewire providing an inductive field along portions of its length which defines paths for vehicles adapted to follow said field, at least one of said paths having plural destinations spaced along its length, two of said portions of said guidewire meeting to form an intersection, first controller means for controlling routing of a vehicle at said intersection, and means aboard said vehicle for applying a destination number signal to said controller means as said vehicle approaches said intersection, said destination number signal being coded to numerically represent a desired destination for said vehicle, said controller means including means for inequality comparing said destination number signal received from said vehicle with a first number stored in said controller to provide a first logic signal, and first switching means responsive to said first logic signal for controlling the routing of said vehicle at said intersection.

2. The system of claim 1 wherein said controller means includes means for inequality comparing said destination number signal with a second number stored in said controller to provide a second logic signal, means for logically combining said first and second logic signals to provide a third logic signal, said switching means being controlled by said third logic signal.

3. The system of claim 1 wherein said controller means includes means for equality comparing said destination number signal with a second number stored in said controller to provide a second logic signal, means for logically combining said first and second logic signals to provide a third logic signal, said switching means being controlled by said third logic signal.

4. The system of claim 1 wherein said controller means includes means for inequality comparing said destination number signal with said first number to provide a second logic signal, one of said logic signals being provided by use of a greater than comparison and the other of said logic signals being provided by use of a less than comparison, means for equality comparing said destination number signal with said first number to provide a third logic signal, and selector switch means for selecting one of said logic signals.

5. The system of claim 1 wherein said controller means comprises a wire loop operable when energized to cancel said inductive field adjacent said two crossing portions of said guidewire and to provide an alternate inductive field extending between said portions, said switching means being operative to control energization and de-energization of said wire loop.

6. The system of claim 1 wherein said controller means includes antenna means situated adjacent one of said portions of said guidewire and operative to receive signals transmitted by said vehicle as said vehicle approaches said intersection, said signals transmitted by said vehicle comprising a bit-serial binary code, and means for converting signals received by said antenna to provide a bit-parallel binary code signal representing said desired destination.

7. The system of claim 1 wherein said system includes second controller means for controlling routing of a vehicle at said intersection, said first controller means being operative to receive said destination number signal when said vehicle approaches said intersection along one of said two portions of said guidewire, and said second controller means being operative to receive said destination number signal when said vehicle approaches said intersection along the other of said two portions of said guidewire, and second switching means controlled by said second controller means.

8. The system of claim 1 wherein said controller comprises means for transmitting a control signal to said vehicle, said two portions of said guidewire carrying currents of different respective frequencies, said vehicle being responsive to said control signal to select one or the other of said frequencies, and said switching means being operative to control said means for transmitting.

9. The system of claim 1 wherein said destination number signal comprises a multi-bit digital signal and said controller means includes means for logically combining at least one bit of said digital signal with said first logic signal to provide a second logic signal, said first switching means being controlled by said second logic signal.

10. The system of claim 2 wherein said means for logically combining said first and second logic signals comprises or gate means.

11. The system of claim 2 wherein said means for logically combining said first and second logic signals comprises and gate means.

12. The system of claim 3 wherein said means for logically combining said first and second logic signals comprises or gate means.

13. The system of claim 3 wherein said means for logically combining said first and second logic signals comprises and gate means.

14. The system of claim 4 wherein said controller means includes second comparison means for comparing said destination number signal with a second number stored in said controller to provide a fourth logic signal, means for logically combining said one of said logic signals selected by said selector switch means with said fourth logic signal to provide a fifth logic signal, said switching means being controlled by said fifth logic signal.

15. The system of claim 7 wherein said first controller means is operative upon its receipt of said destination number signal to cause said second controller means to switch said second switching means, and said second controller means is operative upon its receipt of said destination number signal to cause said first controller means to switch said first switching means.

16. In a wire-guidance system having a pair of energized guidewire sections having surrounding inductive fields defining a pair of intersecting paths having a plurality of destinations, a flux-cancelling loop operable upon energization to cancel portions of the fields along said sections and provide a path extending from one section to the other of said sections, and a controller operable to control energization of said flux-cancelling loop, said controller comprising means for receiving a coded digital signal representing a desired destination from a vehicle traversing one of said sections, means for making a first inequality comparison of said coded digital signal with a fist number stored in said controller to provide a first logic signal, and switching means responsive to said first logic signal for selectively energizing said flux-cancelling loop.

17. The method of routing vehicles which follow paths defined by current-carrying guidewires at intersections along said paths, at least one of said paths having plural destinations spaced along its length, in which said vehicles transmit coded numerical signals representing desired respective destinations to turning controllers in said intersections which comprises the steps of: storing first numbers in said turning controllers at said intersections, inequality comparing said coded numerical signals with respective first numbers stored at said intersections to provide first logic signals, and selectively routing said vehicles at said intersections in accordance with said logic signals.

18. The method of claim 17 which includes the steps of: storing second numbers at said intersections, comparing said coded numerical signals with respective second numbers stored at said intersections to provide second logic signals, combining first and second logic signals to provide third logic signals, said steps of selectively routing said vehicles at said intersections being done in accordance with said third logic signals.

* * * * *

UNITED STATES PATENT OFFICE
CERTIFICATE OF CORRECTION

Patent No. 4,168,760          Dated September 25, 1979

Inventor(s) Ralph E. Paul and Leigh E. Sherman

It is certified that error appears in the above-identified patent and that said Letters Patent are hereby corrected as shown below:

Col. 3, line 2: change "operations" to --operation--
Col. 3, line 32: change "destination" to --destinations--
Col. 3, line 62: change "aooroaches" to --approaches--
Col. 3, line 63: change "imtersection" to --intersection--
Col. 4, line 41: change "by three" to --by the three--
Col. 4, line 61: change "in turn" to --a turn--
Col. 5, line 8: change "device" to --devise--
Col. 5, line 41: change "to legend" to --the legend--
Col. 6, line 66: change "pahse-locked" to --phase locked--
Col. 7, line 59: change "S2" to --S3--
Col. 8, line 16: change "12" to --I2--
Col. 8, line 50: change "two loops" to --two such loops--
Col. 8, line 59: change "while the" to --while in the--
Col. 9, line 5: change "AC2" to --AC1--
Col. 9, line 5: change "L" to --LT--

Signed and Sealed this

Eighth Day of January 1980

[SEAL]

Attest:

SIDNEY A. DIAMOND

Attesting Officer     Commissioner of Patents and Trademarks